(No Model.)
B. MEIER & L. E. FRITSCHE.
PROCESS OF AND APPARATUS FOR DAMPENING GRAIN PREPARATORY TO GRINDING.
No. 477,909. Patented June 28, 1892.
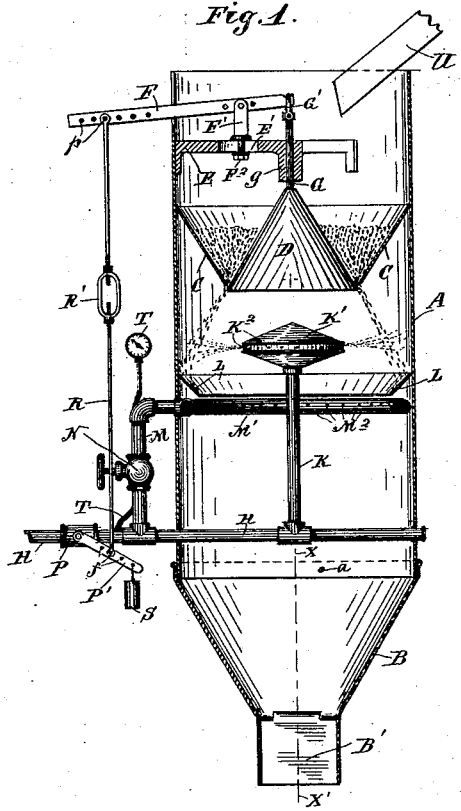
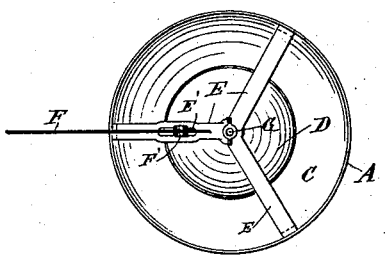

UNITED STATES PATENT OFFICE.

BEAT MEIER AND LOUIS E. FRITSCHE, OF MINNEAPOLIS, MINNESOTA.

PROCESS OF AND APPARATUS FOR DAMPENING GRAIN PREPARATORY TO GRINDING.

SPECIFICATION forming part of Letters Patent No. 477,909, dated June 28, 1892.

Application filed September 21, 1891. Serial No. 406,316. (No model.)

*To all whom it may concern:*

Be it known that we, BEAT MEIER and LOUIS E. FRITSCHE, citizens of the United States, residing at Minneapolis, in the county of Hennepin and State of Minnesota, have invented certain new and useful Improvements in Processes of and Apparatus for Dampening Grain Preparatory to Grinding; and we do hereby declare the following to be a full, clear, and exact description of the invention, such as will enable others skilled in the art to which it appertains to make and use the same.

Our invention relates to grain-steamers, and has for its object to provide an improved apparatus for the purpose.

In the modern system of milling it has become the custom, in order to facilitate the separation of the bran from hard wheat, to dampen or temper the grain by the application of moisture to the same before grinding. It was found in the reduction of hard wheat when dry that the bran would be broken into fine bits on the rolls and the separation of the same then became a matter of considerable difficulty. By tempering the grain through the application of moisture it has been discovered that the breaking or subdivision of the bran may be avoided. On the first squeeze of the rolls the bran will split and leave the grain in two parts, the same being of such size that they are readily separated from the rest of the stock.

In our apparatus we employ a suitable case or guideway, through which the grain is fed, a suitable feeding device or devices adapted to distribute the grain within the said case in the form of a shower, and a steam-supply pipe having one or more discharge-sections within the said case constructed and positioned to discharge the steam in the form of finely-divided jets directly upon the falling shower of grain. Preferably both the feed of the grain and the supply of the steam are automatic. The feeding device is operated by the pressure or gravity of the accumulated grain within the feed-hopper to increase or decrease the amount of flow therefrom, and the feeding device is connected with a valve in the steam-supply pipe, which controls the admission of the steam to the said discharge-sections. The steam-supply valve will therefore be automatically opened and closed by the feeding device and the supply of steam increased or decreased proportionately to the flow of the grain.

Our preferred form of the apparatus is illustrated in the accompanying drawings, wherein like letters refer to like parts throughout the several views.

Figure 1 is a sectional side elevation of the apparatus, and Fig. 2 is a plan of the same. Fig. 3 is a sectional elevation on the line X X' of Fig. 1, showing the removable hopper constituting the bottom of the case detached.

A is the case, shown as of cylindrical form and having secured to its lower end by means of a slot and pin $a$ the removable conical bottom or discharge-hopper B.

C is the feed-hopper in the form of a truncated cone secured within and near the top of the case with its small end down.

D is a conical gate or distributing-head working apex uppermost within the discharge-opening of the feed-hopper and normally closing the same.

E is a spider-like bracket secured to the case above the hopper.

F is a lever of the first class fulcrumed to the pronged standard F', adjustably secured by nut $F^2$ and slot E' to one arm of said bracket.

G is a sliding rod or plunger working through a seat $g$ in the bracket E central of the case, having its lower end secured to the apex of the conical gate D and its upper end attached by means of a link G' to the inner end of the lever F.

H is the steam-supply pipe extending into the case A near its bottom and provided at the center of the case with a vertical branch K, terminating immediately under the discharge-opening of the hopper in an enlarged nozzle-head K', perforated on its horizontal circumference, as shown at $K^2$.

L is an annular deflecting-flange secured internally of the case A below the nozzle-head K'.

M is a branch from the supply-pipe H, extending from without the case and terminating within the same in an annular discharge section or coil M', located immediately under the deflecting-flange L and provided on its inner surface with a series of perforations $M^2$.

N is a valve located on the branch M for independently regulating the flow of steam to the discharge-section M' or entirely cutting it out of action when not required for use.

P is another valve located on the supply-pipe H for controlling the supply of steam to both of the discharge-sections. This valve P is operated by a lever P', which is connected by an adjustable connecting-link R with the outer end of the lever F. The levers F and P' are provided, respectively, with perforations $f$ and $p$, which permit an adjustment of the powers of the levers to vary the counterpoise set against the conical gate of the feed-hopper. The connecting-link R is adjusted in length to set the valve P in the proper position relative to the conical gate D of the feeding-hopper by means of a threaded swivel-nut R'.

S is a weight attached the projecting end of the lever P', which tends to keep the valve P and the conical gate D in their normal or closed positions, as shown.

T is a pressure-indicator.

The hopper-bottom B is provided with a pivoted gate B', normally closed by a weight $B^2$, secured thereto, and automatically opened against the gravity of the said weight by the pressure of accumulated grain in the said hopper.

The apparatus is supported in any suitable frame-work and the grain is delivered thereto in any desired manner, as by a chute U.

The operation is obvious. Normally the steam-supply valve is closed and the conical gate or distributing-head is in its uppermost position, preventing the discharge from the feed-hopper. Upon the accumulation of grain within the hopper the conical gate will be forced downward, permitting the grain to escape in the form of a shower, and the steam-supply valve will also be opened, admitting steam to the discharge-sections. The shower of grain as it comes from the feed-hopper will first be traversed and enveloped by the jets of steam from the nozzle-head K'. It will then strike the deflecting-flange L and be shunted or directed toward the center of the case and be traversed and enveloped by the jets of steam from the coil M'. Thence it will fall into the discharge-hopper B and be passed therefrom by the automatic gate B'. The amount of the flow of the grain from the feed-hopper and the amount of steam discharged thereon will vary according to the amount of grain delivered to the head of the case through the grain-supply chute U. In case it is found that the steam supplied from the nozzle-head K' is sufficient to properly moisten the grain, the coil M' may be cut out by the hand-valve N. It should be noted that some grain always remains in the feed-hopper and in the discharge-hopper, the counterpoises being so set as to give this result. In virtue of this fact the steam can neither escape through the feed-hopper nor the discharge-hopper at the beginning of the operation. Hence it will be taken up by the grain and pass out with the same through the discharge-hopper, when the machine is in operation. The grain sealing of the openings at the feed and discharge hoppers is important, increasing the efficiency of the machine. It will be noted that the steam from the different discharge-sections is thrown from opposite directions on the shower of grain. The steam from the nozzle K' strikes the grain from the inside of the shower, and the steam from the coil M' strikes the shower from the outside of the same. It will of course be understood that in case the one or two discharge-sections of steam-pipe should be inadequate to properly temper the grain in the limited time permitted by the fall of the grain the case could be extended and other discharge-sections added to the steam-supply pipe in order to obtain the requisite moisture. We have so far found the apparatus shown sufficient for the purpose.

Although this apparatus was designed, as has been stated, to carry out our process of dampening the grain and tempering the same by the direct action of steam, it is obvious that the apparatus would be capable of use as a drier by the substitution of hot air for the steam.

What we claim, and desire to secure by Letters Patent of the United States, is as follows:

1. An apparatus for tempering grain, comprising a suitable case through which the grain is fed, a steam-supply pipe having one or more discharge-sections within said case, an automatic feeding device for distributing the grain within the case, and a valve in said steam-supply pipe operated by said feeding device, whereby the supply of steam is varied according to the feed of the grain, substantially as described.

2. The combination, with a suitable case, of the supply-pipe H, having one or more discharge-sections within the case, the truncated feed-hopper C, the conical feed-gate D, the valve P, having a valve-lever P', a lever F, having one end connected to the head of the feed-gate and the other end connected to the valve-lever P, and a counterpoise S, operating on said levers to hold said gate and valve normally in their closed positions, substantially as described.

3. The combination, with the case A, of the hopper C, the conical feed-gate D, the pipe H, having discharge-sections within the case, the support E, with guide $g$, the lever F, fulcrumed to the standard F', adjustably seated in the support E, the valve P, having the lever P', the plunger G, working through the guide $g$, the link G', connecting the said plunger with said lever F, the link R, with swivel-nut R', connecting the free ends of the levers F and P', and a counterpoise S, acting to hold said gate and valve in their closed position, substantially as described.

4. The combination, with a suitable case, of a truncated feed-hopper near the head of the case, a counterpoised conical feed-gate or distributing-head working in the discharge-opening of said hopper, a fluid-supply pipe having one or more discharge-sections within the case below the said hopper in position to discharge the fluid on the shower of material falling from the hopper, and a valve in the supply-pipe controlled by said feed-gate, substantially as described.

In testimony whereof we affix our signatures in presence of two witnesses.

BEAT MEIER.
LOUIS E. FRITSCHE.

Witnesses:
JAS. S. WILLIAMSON,
EMMA F. ELMORE.